Sept. 20, 1971 W. T. IRWIN ET AL 3,605,397
EXPANDED FIBER GLASS STRAND
Original Filed Dec. 26, 1962 2 Sheets-Sheet 1

INVENTORS
WINFIELD T. IRWIN
WARREN W. DRUMMOND
BY
Chisholm and Spencer
ATTORNEYS

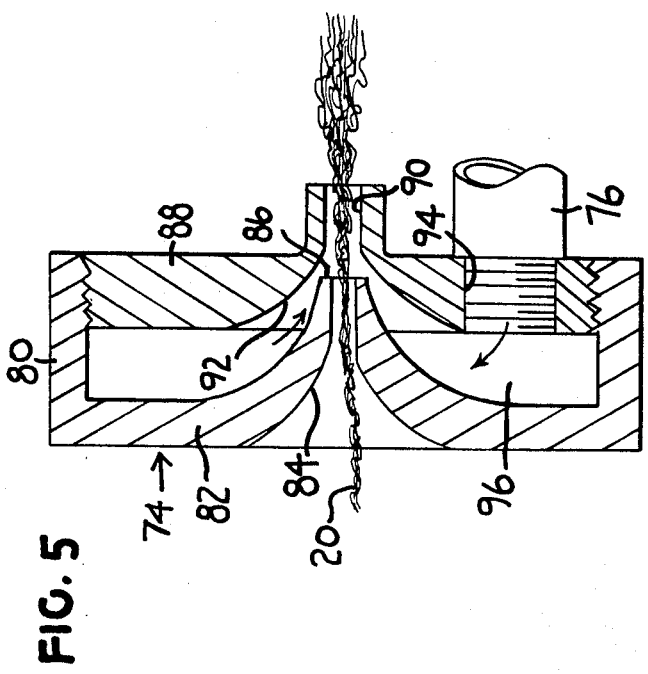
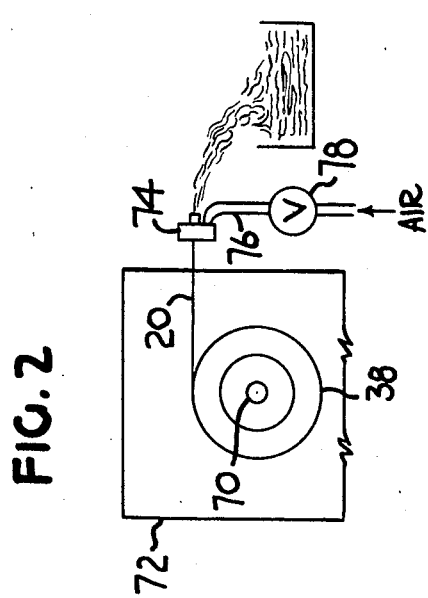
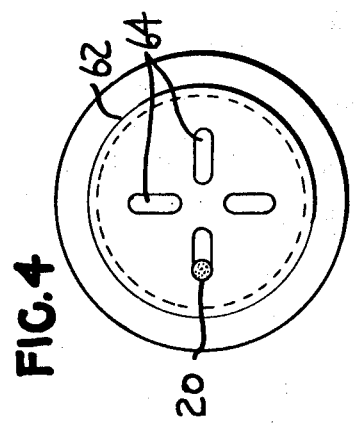
INVENTORS
WINFIELD T. IRWIN and
WARREN W. DRUMMOND
ATTORNEYS

United States Patent Office

3,605,397
Patented Sept. 20, 1971

3,605,397
EXPANDED FIBER GLASS STRAND
Winfield T. Irwin, Pittsburgh, and Warren W. Drummond, Allison Park, Pa., assignors to PPG Industries, Inc., Pittsburgh, Pa.
Application Feb. 15, 1968, Ser. No. 705,666, now Patent No. 3,491,527, dated Jan. 27, 1970, which is a continuation of application Ser. No. 246,889, Dec. 26, 1962. Divided and this application July 1, 1969, Ser. No. 838,119
Int. Cl. D02g *3/18*
U.S. Cl. 57—140G                                1 Claim

ABSTRACT OF THE DISCLOSURE

A permanently crimped, multifilament fiber glass product produced by providing a multifilament bundle of untwisted, permanently crimped fiber glass strands and, thereafter, moving said filaments relative to one another.

CROSS-REFERENCE TO RELATED APPLICATIONS

This application is a division of copending application Ser. No. 705,666, filed Feb. 15, 1968, now U.S. Pat. 3,491,527, granted Jan. 27, 1970, which latter application is a continuation of application Ser. No. 246,889, filed Dec. 26, 1962, now abandoned, by Winfield T. Irwin and Warren W. Drummond for Fibrous Product and Process of Making the Same.

This invention relates to a fibrous product and the process of making the same and more particularly to a fibrous product formed from a plurality of continuous glass fibers and the method of making the fibrous product.

In the manufacture of a continuous fiber glass strand, a number of individual glass filaments or fibers are drawn from an electrically heated platinum bushing containing a supply of molten glass. The individual filaments are grouped into a strand and the strand is wound onto a forming tube. There is no twist in the strand as it is formed and the filaments are bonded together with a suitable organic binder. The binder is applied to each of the individual filaments prior to the time that they are grouped into a strand and wound on the forming tube. The strand is removed from the forming tube and wound on bobbins or other suitable devices for the making of yarn to be later used in knitting or weaving fabrics.

Preshaped expanded fibrous mats, as distinguished from the above discussed strands, may be formed by several different processes. In one process the mechanically drawn filaments are chopped into short segments and thereafter, by means of either picking or air blowing, are randomly deposited on a collecting means. The expanded fibrous mats are therefore formed of short lengths of randomly grouped filaments and have a high bulk and low density. An organic binder is usually applied to the mats after they are formed to hold the randomly grouped short filaments together. The expanded mats with the organic binder have limited resiliency.

It is apparent that the apparatus required to make preshaped expanded fibrous mats by the above process does not readily lend itself to forming the fibrous mats at the ultimate point of use. It has, therefore, been the practice to make the expanded fibrous mats at centralized locations and transport them to the ultimate point of use in a conventional manner. Thus, the transportation of the high bulk, low density fibrous mats accounted for a substantial portion of their cost. Substantial space is required to store the high bulk, low density preshaped fibrous mats.

The preshaped fibrous mats made by the known processes have a further limitation in that they do not readily fill irregularly shaped cavities. The mats must be sized, cut and fitted to be properly utilized on irregularly shaped objects and in irregularly shaped cavities.

There is a need for a high bulk and low density fibrous product that can be used to fill irregularly shaped cavities. Such a product would eliminate much of the manual labor now required to install conventional fibrous mats. There is, moreover, a greater need for a high bulk, low density fibrous product that does not require substantial space during transportation and storage.

The fibrous product obtained by the process of the present invention has a high bulk and a low density. The product is transported to the point of ultimate use and stored as a compact, high density, low bulk yarn. By inexpensive, portable apparatus the yarn is expanded at the job site into a fibrous product having a high bulk and low density. The fibrous product is resilient and has high dimensional stability. The expanded fibrous product may be utilized in much the same manner as fibrous mats in that a continuous strand or tow of high density crimped yarn can be expanded into a high bulk, low density, continuous expanded tow and the expanded tow deposited directly into cavities where preshaped expanded fibrous mats were formerly used. The expanded product may also be utilized as a thermal insulating material which is enclosed in a pretailored flexible container that is wrapped around irregularly shaped objects to form thermal insulating blankets enclosing the irregularly shaped object. Because of the high dimensional stability of the fibrous product, the thermal insulating blankets are readily removable and reusable without settling, sagging or shifting of the fibrous product within the flexible container.

Briefly, the process of this invention utilizes a plurality of strands that may be manufactured in the manner previously described. The strands are grouped into a yarn and the yarn is twisted in one direction. While twisted, the yarn is subjected to an elevated temperature. The twist deforms or crimps the filaments in the strands so that the strands and filaments have a curved coil spring-like configuration and are deformed in three dimensions. The elevated temperature softens the filaments in the strands so that they are permanently deformed in the curved configuration. The elevated temperature further thermally decomposes the organic binder that bonds the filaments to each other. The twisted, permanently deformed strands are then untwisted. The diameter of the yarn after crimping and untwisting does not, however, increase to any substantial extent. The crimped yarn is a high density, low bulk material that is wound onto a package and transported or stored in this high density, low bulk condition.

At the job site the crimped, high density yarn is unwound from the package and by means of an air jet is expanded to laterally separate a substantial number of the filaments in the strands. The yarn as it is expanded retains its continuity and forms a continuous expanded yarn having a low density and a high bulk. The expanded yarn has a generally cylindrical configuration and a majority of the fibers appear to be oriented parallel to the axis of the cylindrical expanded yarn. The individual filaments appear to be held together by the mechanical engagement of the coiled or convoluted portions of the filaments at random intervals throughout their length.

Although the fibrous product obtained by the herein described process may be expanded at the ultimate point of use and utilized as in insulating material, it is within the scope of this invention to crimp the yarn and thereafter expand the yarn to a limited extent at the same location and utilize the expanded yarn for fabrics or the like. It has been found that the crimped and expanded yarn has desirable texture, springiness and resiliency not present in other yarns made of fibrous strands.

The term "crimped strand" or "crimped filament" as used hereinafter denotes a strand or filament that is permanently deformed and has a generally helical configuration similar to that of a coil spring or cork screw. The filaments are deformed in three dimensions, that is, the individual filaments are deformed into the shape of a helix rather than a flat sinusoidal form where the filaments are deformed in two dimensions. The term "crimped strand" or "crimped filament" is also intended to denote a strand or filament that is deformed in three dimensions, and when viewed in two dimensions has the appearance of a prolate cycloid, as illustrated in FIG. 34, page 31 of the Appendix of Mathematical Tables and Formulas in "Lange's Handbook of Chemistry," compiled and edited by Norbert Adolph Lange, Ph.D., and published by Handbook Publishers, Inc., 1944—Fifth edition. It should be understood, as hereinafter explained, that certain operating conditions may be varied to change the shape of the strands and filaments. The term "tow" as used herein is intended to designate a collection of strands. The term "strand" is intended to designate a collection of filaments.

Accordingly the principal object of this invention is to provide a fibrous product formed of continuous filaments and having a low density and a high bulk.

Another object of this invention is to provide a crimped yarn of fibrous filaments that has desirable texture, springiness and resiliency.

Another object of this invention is to provide a high bulk, low density fibrous product of continuous fibrous filaments, the fibrous filaments being so shaped that they mechanically adhere to each other.

A further object of this invention is to provide a process for permanently crimping fibrous strands and for expanding the permanently crimped fibrous strands.

These and other objects and advantages of this invention will be more completely described and distinctly pointed out in the following specification, the accompanying drawings, and the appended claim.

In describing the preferred embodiment of this invention, illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

In the drawings:

FIG. 2 is a schematic representation of the process for expanding the crimped yarn.

FIG. 4 is a front view of the false twist device illustrated in FIG. 3.

FIG. 5 is an enlarged view of the air jet employed to expand the crimped yarn.

FIG. 6 is an illustration of a segment of high density yarn crimped according to the process of FIG. 1.

FIG. 7 is an illustration of the same segment of crimped yarn after it has been expanded by the process illustrated in FIG. 2. The expanded yarn illustrated in FIG. 7 has a low density.

Figure 1:
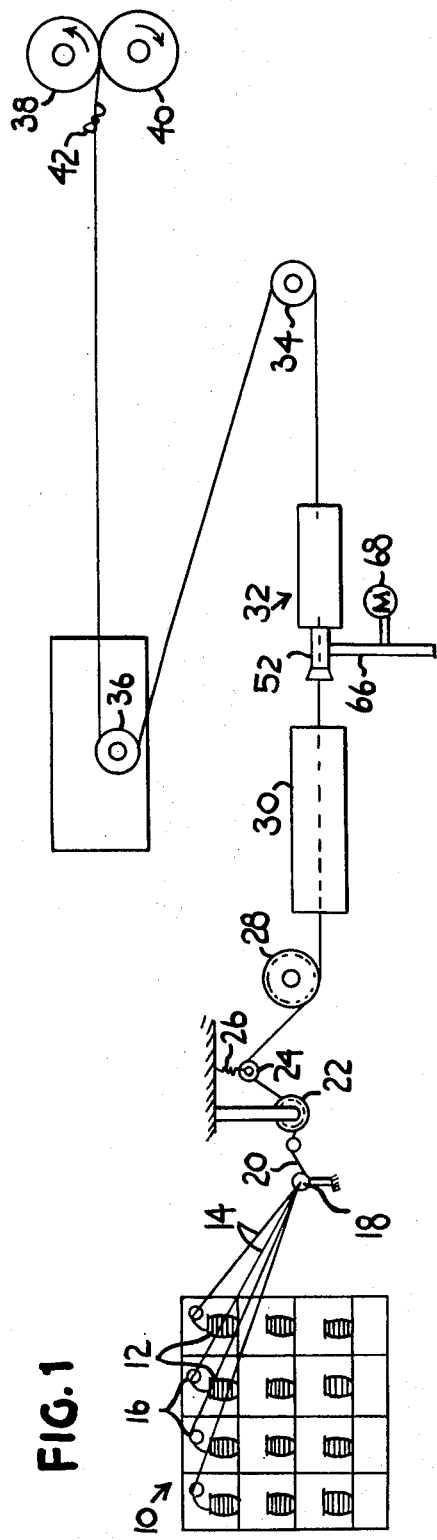
FIG. 1 is a schematic representation of the process for preparing crimped yarn from continuous strands of fiber glass.

Referring to FIG. 1, there is a creel structure 10 on which there are positioned a plurality of packages 12. Each of the packages 12 has a strand of fiber glass wound thereon. The fiber glass strands are formed of a plurality of fibrous filaments as previously described. The filaments are grouped into a strand and are bonded by means of a suitable binder. The strands 14 are threaded through suitable guides 16 on the creel structure 10 and are grouped on another guide 18 to form a tow 20. Other suitable conventional means can be utilized in place of the creel structure to form the tow 20.

The tow 20 passes through a tensioning device 22 and then over a roller 24. The roller 24 is carried by a spring 26 which serves as a shock absorber for abrupt tension changes. The tensioning device 22 can vary the tension of the tow 20 by any suitable means such as an electro magnetic control or the like. A capstan or Godet wheel 28 is positioned adjacent one end of a tubular furnace 30 and a twister device 32 is positioned adjacent the other end of furnace 30. The Godet wheel 28 has a wedge shaped circumferential recessed portion that exerts a radial gripping action on the tow 20 and serves to stop the tow from twisting axially, as later explained. The tow 20 extends beneath the Godet wheel 28 and through the tubular furnace 30. From the tubular furnace 30 the tow 20 passes through a false twister generally designated by the numeral 32. The tow 20 extends around roller 34 and around the motor driven pulling roll 36. Both roller 34 and pulling roll 36 may be Godet wheels or they may be fabricated of rubber or the like. The motor driven pulling roll 36 serves to pull the strands 14 from the packages 12 and through the furnace 30 and twister 32. A suitable means is provided with the pulling roll 36 to vary the linear velocity of the tow 20 as it passes through the furnace 30 and the twister 32. The end of the tow 20 is wound on a winding device or package 38 by means of a surface driven takeup roll 40. A traversing device 42 serves to distribute the tow 20 on the package 38.

Figure 3:
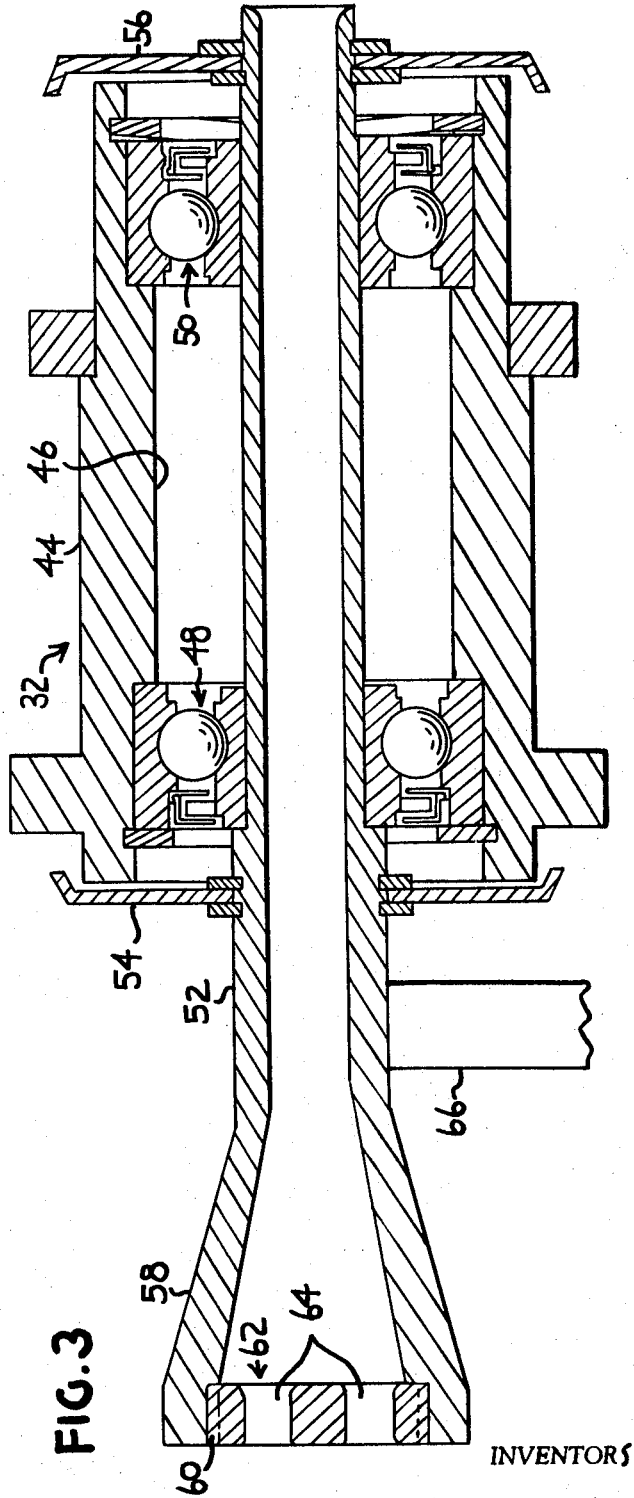
FIG. 3 is a sectional view in side elevation of a false twist device suitable for use in the process illustrated in FIG. 1.

A suitable false twister 32 is illustrated in FIGS. 3 and 4 and has a fixed body portion 44 with an axial bore 46. Mounted within the bore 46 are a pair of bearings 48 and 50. A tubular spindle 52 is supported in bearings 48 and 50 and is arranged for high speed rotation relative to the fixed twister body portion 44. Suitable dust seals 54 and 56 are mounted on the spindle 52 and reduce the dust contamination of bearings 48 and 50. The spindle 52 has an outwardly flared end portion 58 with an inner recessed portion 60. A disc shaped insert 62 (FIG. 4) is positioned in the recessed portion 60 and is suitably secured therein. The insert 62 has four radial slots 64 therein, one of the slots arranged to have the tow 20 threaded therethrough. The slots 64 are radially spaced in the insert 62 in a symmetrical manner so that the insert and the spindle are symmetrically balanced. The periphery of a friction wheel 66 abuts the outer wall of spindle 52. The friction wheel 66 is connected to a variable speed motor 68 (FIG. 1) and is arranged to rotate the spindle at a high rate of speed. The apparatus schematically illustrated in FIG. 1 is utilized to permanently crimp or deform the generally rectilinear fibers in strands 14, as will be later discussed.

In FIG. 2 the apparatus for expanding the crimped tow is illustrated. The package of crimped tow 38 formed by the process of FIG. 1 is positioned on a horizontal spindle 70. The spindle 70 is mounted on any suitable support, schematically illustrated at 72 in FIG. 2. The support for the spindle 70 is preferably portable so that the expansion of the crimped tow 20 can be accomplished at any desired location. The crimped tow 20 is threaded through an air jet or nozzle generally designated by the numeral 74. A source of air enters jet 74 through conduit 76. Suitable valve means 78 is provided in conduit 76 to regulate the amount of air entering the jet 74. Although a spindle 70 is described as supporting the package of crimped tow, it should be understood that other suitable package supports could be utilized to unwind the crimped tow from the package. For example, instead of rotating the package 38, the crimped tow can be delivered to the jet 74 "over end" from a stationary package supported in a suitable manner.

The jet 74 is illustrated in section in FIG. 5 and has a cylindrical body portion 80 with an end wall 82. The end wall 82 has a central inwardly flared aperture 84 terminating in an axial nozzle 86. A disc shaped member 88 is threadably secured to the body portion 80 and has an axial aperture 90 therethrough with an inwardly flared portion 92. The member 88 is spaced from the body portion end wall 82 and has a threaded connection 94 for air conduit 76. The spaced relation between wall 82 and member 88 provides a cavity 96 to distribute the air entering through conduit 76 and is utilized to control the expanded diameter of the tow. Air entering through conduit 76 passes through the cavity 96, as indicated by the arrows in FIG. 5, and an annular jet or stream of air impinges on the cylindrical outer surface of crimped tow 20 to expand the tow 20, as indicated in FIG. 5. For example, the tow 20 entering the jet 74 has a configuration similar to that illustrated in FIG. 6. The expanded tow 20 being ejected from the jet 74 has a configuration similar to that illustrated in FIG. 7. The linear velocity of the tow passing through jet 74 and the expanded diameter of the tow 20 is controlled by the air pressure and the spacing between dics 88 and the wall 82.

OPERATION

The process illustrated in FIG. 1 permanently deforms or crimps the fibers is strands 14 in the following manner. The strands 14 have a generally rectilinear configuration and the filaments of each strand are bonded together by a suitable organic binder. The strands are grouped into the tow 20 having a generally rectilinear configuration at guide 18. The tow is pulled through tensioning device 22, over idler 24 and around the Godet wheel 28. The tow 20 is pulled through furnace 30 and twister 32 and around idler 34 and pulling roll 36. The false twister 32 imparts a twist to the tow in one direction between false twister 32 and the Godet wheel 28. A twist in the opposite direction is imparted to the tow 20 from the false twister 32 to the idler 34. The Godet wheel 28 and the idler 34 stop the twisting action imparted by the false twister 32. The twist imparted between false twister 32 and Godet wheel 28 is substantially removed from the tow by the opposite twist exerted between false twister 32 and idler 34 so that the tow 20 as it passes around idler 34 is in a generally untwisted condition.

The twist is imparted to the tow in the following manner. The tow is threaded through one of the slots 64 in the false twister insert 62 and extends linearly through the bore of spindle 56. The tow 20, by means of the centrifugal force exerted thereon by the rotating spindle 52, is urged toward the outer periphery of slot 64, as illustrated in FIG. 4, so that the twister 32 imparts a twist to the tow 20. Slippage between the tow 20 and the spindle slot 64 causes less twist than spindle speed would indicate.

The tow 20, twisted in one direction, is heated in the furnace 30 and the individual filaments are softened so that they are deformed and assume the twisted configuration. The binder bonding the filaments together is thermally decomposed in the furnace 30 and the filaments no longer adhere to each other. As the tow 20 leaves the furnace 30 the filaments quickly cool and harden while in the twisted deformed condition. The tow 20 as it is untwisted between false twister 32 and idler 34 does not unravel or expand to any substantial extent. The crimped tow is wound on package 38 in a conventional manner, has a density of about 30 to 40 pounds per cubic foot, and has the appearance of a package of yarn.

The crimped tow is packaged and transported to distant locations in the same manner as yarn is presently transported. At the destination the crimped tow is expanded with the apparatus illustrated in FIG. 2. All that is required to expand the crimped tow 20 is a means to unwind the tow from the package, and a jet 74 which is provided with a suitable source of air. The crimped tow 20 is threaded through apertures 84 and 90 in jet 74 and disc 88 is adjusted. The air entering through conduit 76 expands the crimped tow and the spacing of disc 88 regulates the diametrical dimension of the expanded tow.

It will be apparent that the process illustrated in FIG. 1 has several variable operating conditions. Some of the variable operating conditions are: the temperature of the tow in the furnace, the tightness of the twist in the tow as it is heated and cooled, and the tension of the tow as it passes through the furnace. Due to the inherent difficulty in accurately measuring the above conditions, operating parameters may be correlated to express the above conditions. For example, with a furnace of fixed longitudinal dimension the temperature of the furnace and the linear velocity of the tow as it is pulled through the furnace (dwell time of the tow in the furnace) can be regulated to control the temperature of the tow in the furnace. The speed of the twister and the linear velocity of the tow as it is pulled through the twister can be regulated to control the tightness of the twist in the tow as it is heated and cooled. The tension of the tow can be controlled in a conventional manner and is readily measurable.

By a proper selection of the operating conditions, it is possible to permanently deform the strands and filaments to preselected curved configurations. For example, a yarn crimped under given operating conditions will have strands and filaments that are permanently deformed into a helical shape like a cork screw or a coil spring. By changing the operating conditions slightly the crimped yarn will have strands and filaments that are deformed in three dimensions and have the appearance of a prolate cycloid in two dimensions with convoluted portions spaced at random intervals. The texture, resiliency, springiness, and dimensional stability of the fibrous product is dependent to some extent on the deformed shape of the strands and filaments.

The process for expanding the crimped tow also has several variable operating conditions. It is believed that the air pressure and spacing of the disc in the air jet control the linear velocity of the tow through the jet and the expansion of the tow. The air jet laterally separates a substantial number of the filaments in the strands and randomly spaces and orients the filaments. The air also may break certain of the filaments at random intervals. The breaks in the filaments are randomly spaced and do not interrupt the continuity of the tow.

One of the primary features of this invention is the deforming of the continuous filaments so that the filaments are mechanically engaged at random intervals so that the expanded tow is a continuous, multifilament yarn. The expanded tow is dependent upon the mechanical engagement of the filaments to provide a unitary continuous product. The organic binder that bonded the filaments to each other is thermally decomposed in the furnace and the filaments are dependent on their mechanical engagement to hold them together. It appears that the filaments have random coils or convolutes that overlap and interlock to hold the filaments together.

EXAMPLES

Example I

About two hundred filaments of fiber glass having a diameter of about .00038 inch were formed into a single strand. An organic starch size binder was applied to the filaments and the filaments were bonded to each other. Thirty of the above strands were grouped into a tow and the tow was subjected to a tension of about 50 g and pulled through the furnace and twister at a linear velocity of about 150 feet per minute. The tow was subjected to a temperature of about 1600° F. in a furnace having a longitudinal dimension of five feet and the false twister was roated at a speed of about 14,500 r.p.m. A crimped tow was formed and wound on a package. The crimped tow had a density of about 35 pounds per cubic foot.

The crimped tow was expanded by an air jet similar to that illustrated in FIG. 5. The jet was supplied with air at a pressure of about 80 pounds per square inch and was adjusted so that the tow expanded to a diameter of about eight times its original diameter.

The expanded tow had a density of about 0.2 pound per cubic foot. The filaments in the expanded tow were deformed in three dimensions and in a relaxed state random segments of the filaments had a prolate cycloid configuration in two dimensions. Under slight tension the expanded tow elongated and the filaments assumed a helical configuration. A segment of the expanded tow was subjected to a tension and elongated about one and one-half times its original length and, when the tension was relieved, returned to its original longitudinal dimension. The expanded tow was stuffed into a flexible cloth-like container to a density of between 4 and 6 pounds per cubic foot until the container had a predetermined thickness. The container was subjected to compressive force of 45 pounds per square foot for several days. The flexible container, after the compressive force was relieved, returned to its original thickness, illustrating the dimensional stability and resiliency of the expanded tow.

The thermal conductivity of the expanded tow was measured at different approximate densities and different approximate mean temperatures and the following measurements were obtained.

| Density (lbs./cu. ft.) | k B.t.u./in./hr./sq. ft./° F. at mean temp. of— | | |
|---|---|---|---|
| | 200° | 300° | 500° |
| 3.9 | .25 | .31 | .45 |
| 5.7 | .25 | .32 | .46 |
| 7.6 | .25 | .31 | .45 |

Example II

Four hundred filaments of fiber glass having a diameter of about .00025 inch were formed into a single strand. An organic starch size binder was applied to the filaments and the filaments were bonded to each other. Thirty of the above strands were grouped into a tow and the tow was subjected to a tension of 50 g and was pulled through a furnace having a linear velocity of about 150 feet per minute. The tow was subjected to a temperature of about 1500° F. in a furnace having a longitudinal dimension of 5 feet and the false twister was rotated at a speed of 14,500 r.p.m. A crimped tow was formed and wound on a package. The crimped tow had a density of 35 pounds per cubic foot.

The crimped tow was expanded by an air jet similar to that in FIG. 5. The jet was supplied with air at a pressure of about 80 pounds per square inch. The air jet was adjusted so that the tow was expanded to a diameter of about eight times its original diameter. The expanded tow had a density of about 0.2 pound per cubic foot. The filaments in the expanded tow were deformed in three dimensions and had a generally helical configuration. The tow exhibited dimensional stability and resiliency.

Example III

Thirty strands of fiber glass formed in the same manner as in Example I were subjected to substantially the same conditions as in Example I. Between the pulling roll 36 and the winding drum 42 the crimped tow was threaded through the air jet and was subjected to air pressures of about 80 pounds per square inch. The disc in the air jet was adjusted so that the crimped tow was expanded to a diameter about five times its original diameter. The expanded crimped tow was then wound on a package for use as a textured yarn in the weaving and knitting of fabrics. The expanded tow wound on the package had a density of 7 pounds per cubic foot. The expanded crimped tow had desirable resiliency, elasticity and texture not previously available with yarns prepared from fibrous glass filaments and appeared suitable for weaving as a fabric.

In summary, the fibrous product made by the process herein described is resilient and has dimensional stability. The fibrous product is free of organic binders and is incombustible because it consists only of fiber glass filaments. The fibrous product has superior thermal conductivity and may be utilized as a thermal insulator at low and high mean temperatures. The fibrous product retains the sound absorption properties of glass fibers and where porous protective surfaces are provided can be utilized as a sound absorbing material. The fibrous product can also be utilized as yarn for knitting or weaving fabrics having improved properties of resiliency and texture.

Although the present invention has been described with respect to specific details of certain embodiments thereof, it is not intended that such details serve as limitations upon the scope of the invention except as set forth in the following claim.

We claim:
1. A multifilament fiber glass product comprising a low density, high bulk mass of expanded glass fibrous strand, the filaments of said strand having a permanently set twist which extends about the central axis of said strand prior to expansion.

References Cited

UNITED STATES PATENTS

| 2,693,844 | 11/1954 | Bay | 28—72.12X |
| 2,797,529 | 7/1957 | Mohr et al. | 28—72.12X |
| 2,909,827 | 10/1959 | Waugh | 28—1.4 |
| 3,081,951 | 3/1963 | Dyer et al. | 28—1X |
| 3,126,095 | 3/1964 | Caines et al. | 28—1X |
| 3,212,691 | 10/1965 | Lockshaw | 28—1.4X |
| 3,262,177 | 7/1966 | Cobb et al. | 28—1.4 |
| 3,411,287 | 11/1968 | Benson | 57—140 |

LOUIS K. RIMRODT, Primary Examiner

U.S. Cl. X.R.

28—72.12